Nov. 12, 1940.     H. P. HOOD ET AL     2,221,709
BOROSILICATE GLASS
Filed Jan. 29, 1938     2 Sheets-Sheet 1

INVENTOR.
HARRISON P. HOOD
AND MARTIN E. NORDBERG
BY Dorsey, Cole + Garner
ATTORNEYS.

Nov. 12, 1940.    H. P. HOOD ET AL    2,221,709

BOROSILICATE GLASS

Filed Jan. 29, 1938    2 Sheets-Sheet 2

INVENTOR.
HARRISON P. HOOD
AND MARTIN E. NORDBERG
BY Dorsey, Cole + Havener
ATTORNEYS.

Patented Nov. 12, 1940

2,221,709

UNITED STATES PATENT OFFICE 2,221,709

BOROSILICATE GLASS

Harrison P. Hood and Martin E. Nordberg, Corning, N. Y., assignors to Corning Glass Works, Corning, N. Y., a corporation of New York Application January 29, 1938, Serial No. 187,770

4 Claims. (Cl. 106—36.1)

This application is a continuation in part of our copending application Serial Number 716,418 filed March 19, 1934 which issued February 1, 1938, as Patent No. 2,106,744. This patent discloses methods by which it is possible to obtain transparent homogeneous shaped glass articles having a composition of approximately 5% $B_2O_3$, .5% $R_2O$, and the balance silica.

The present invention has for its primary object the improvement of the final compositions disclosed and claimed in the above patent.

A further object of the invention is a glass having an expansion coefficient between that of pure silica and the lowest expansion silicate glass heretofore made. A still further object of the invention is a glass composition having an extremely high softening temperature.

Among its features the invention includes a glass containing silica, boric oxide and alkali oxide, the silica being over 94%, the boric oxide under 6%, and the alkali oxide under .25%.

In the practice of the invention disclosed in our prior application we have now discovered that by proper control within relatively narrow limits of certain factors or conditions, namely, (1) the initial composition of the glass; (2) temperature and time of the heat treatment, and (3) temperature and strength of the leaching acid, the swelling or shrinking of the glass and hence the stresses set up thereby during the leaching step can be controlled and the efficiency of the process greatly improved and glasses having lower expansion coefficients, higher softening temperatures and greater resistance to devitrification can be produced by the new method.

In describing the invention it is convenient to fix two of the above recited variable factors in order to consider the permissible variations in the third within the range of which little or no strain will be produced. Therefore the initial glass compositions will first be considered with respect to a heat treatment at 550° C. for 20 hours followed by leaching with 3 normal hydrochloric or nitric acid at 90° C.

Figure 1:
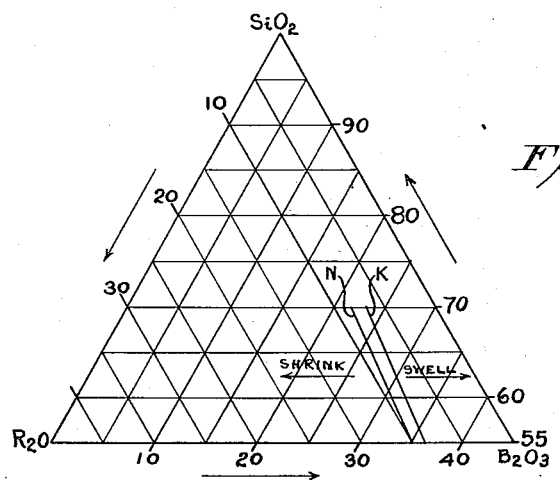
Fig. 1 is a graph on triangular coordinates which represents certain glass compositions of the ternary system $R_2O$—$B_2O_3$—$SiO_2$ where $R_2O$ is the alkali metal oxide $Na_2O$ or $K_2O$.

With the heat treatment and leaching factors thus fixed, we have found that for the three component system $Na_2O$—$B_2O_3$—$SiO_2$ the initial glass compositions which will develop no stress during leaching fall roughly on a straight line generally designated N in the triangular graph in Fig. 1, which line passes through and is defined by four points corresponding to the following compositions:

|  | I | II | III | IV |
|---|---|---|---|---|
| $SiO_2$ | 55.0 | 60.0 | 65.0 | 70.0 |
| $Na_2O$ | 10.0 | 9.5 | 9.0 | 8.5 |
| $B_2O_3$ | 35.0 | 30.5 | 26.0 | 21.5 |

Although the line N within the limits of experimental error represents compositions of glasses in which no stress will be developed under the above recited conditions, variations in these conditions will produce a slight deviation of the line, as will later appear. In general, glasses, the compositions of which are represented by points at the right of the line, will swell when subjected to the heat treating and leaching conditions noted above and glasses represented by points at the left of the line will shrink under those conditions as is indicated in Fig. 1. Swelling or shrinking will become more pronounced as the composition is further removed from the line. During leaching, swelling will cause tensional stress in the unleached portion of the glass and shrinking will cause tensional stress in the leached layer. Since breakage is caused by tensional stress rather than by compression and since the leached layer is inherently weaker than the unleached portion and further since surface flaws may cause further weakening, shrinking is more objectionable than swelling. Compositions in this system, which are suitable for use under the above recited fixed conditions, are defined as those containing 55% to 70% $SiO_2$, (10 minus IX)% Na₂O, X being the excess of silica over 55%, and the balance being B₂O₃.

In the above recited range of compositions, K₂O may be substituted wholly or in part for Na₂O but in that case it is necessary also to decrease somewhat the ratio of alkali to boric oxide by weight. An example of such substitution is the following composition in which Na₂O is completely substituted by K₂O:

V

|   | Per cent |
|---|---|
| SiO₂ | 65.0 |
| K₂O | 7.5 |
| B₂O₃ | 27.5 |

In Fig. 1 a line K defines all compositions in the system K₂O—B₂O₃—SiO₂ which, on being heat treated and leached under the above recited fixed conditions, will develop substantially no stress in the glass during the leaching step. The same relationships apply to the line K as were described in the consideration of the line N. Compositions in this system which are suitable for use under the fixed conditions are defined as those containing 55% to 70% SiO₂, (8.5 minus .1X) % K₂O, X being the excess of silica over 55%, and the balance being B₂O₃.

Considering the two lines N and K, it will be noted that in each the silica contents vary from 55% to 70%, but in line K the alkali oxide varies from 7% to 8.5%, whereas in line N the alkali oxide content varies from 8.5% to 10%, the balance of the composition in each case being boric oxide. The compositions containing either or both of the alkalies may be expressed as comprising 55% to 70% SiO₂ and (10 minus 1.5Y minus .1X) % R₂O, here R₂O is the total K₂O and Na₂O, Y is the ratio $$\frac{K_2O}{R_2O}$$

and X is the excess SiO₂ over 55% and containing boric oxide.

Alumina up to 4% may also be introduced into the compositions represented by the line N, but, in order to maintain zero strain the percentage of Na₂O must be decreased. The amount by which the percentage of Na₂O must be decreased for any given addition of Al₂O₃ within the range 0-4% Al₂O₃ has been found to be proportional roughly to the square of the Al₂O₃ content and the proportionality factor is about .17. Moreover, as the Al₂O₃ content is increased up to 4% the lower limit of the SiO₂ content may be decreased in the proportion 1.25% SiO₂ for each per cent of Al₂O₃ and with a content of 4% Al₂O₃ the SiO₂ may be as low as 50%. Therefore, glasses in the quaternary system Na₂O—Al₂O₃—B₂O₃—SiO₂, which will develop substantially no strain when heat treated and leached under the above recited fixed conditions, are confined to a range of compositions that may be defined by the following expression. (55 minus 1.25Z) % to 70% SiO₂, 0 to 4% Al₂O₃, (10 minus .1X .17Z²) % Na₂O and the remainder B₂O₃, where Z is the percentage of Al₂O₃ and X is the excess of SiO₂ over 55%, it being understood that X is negative when the SiO₂ is less than 55%.

As mentioned above, a variation in the conditions of heat treating and leaching the glass will cause a variation in the results obtained with glass compositions represented by points on the liens N and K of Fig. 1 and the above defined range of compositions in the quaternary system. That is to say, such compositions represent a series of glasses in which substantially no stress will be developed when they are heat treated at 550° C. for 20 hours and are subsequently leached in 3 normal acid at 90° but, when the time and/or temperature of heat treatment are altered within limits the points representing glasses, which will develop substantially no stress, will not fall exactly upon these lines but will be slightly removed therefrom and will fall at one side or the other of the lines as the case may be.

In general, when the time of heat treatment is extended beyond 20 hours, an increase in the ratios R₂O:B₂O₃ and R₂O plus Al₂O₃:B₂O₃ over those represented in the above defined glass compositions is essential in order to avoid the development of stress during leaching and for heat treatments of less than 20 hours a decrease in these ratios are essential. The temperature at which heat treatment is carried out will also affect the amount of stress developed during leaching and hence must be considered in connection with the time or duration of the heat treatment.

Figure 2:
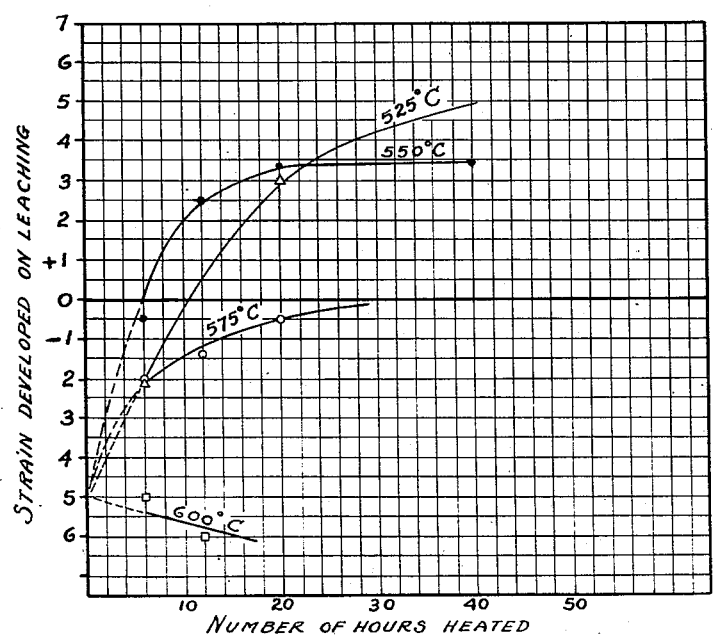
Fig. 2 is a plot showing the variation in strain developed in the unleached portion of a glass of specific composition heat treated at different temperatures for different lengths of time.

The relationship between time and temperature of heat treatment is shown in the curves of Fig. 2 which represent the results obtained on leaching a series of samples 1 mm. thick of a composition comprising 62.7% SiO₂, 6.6% Na₂O, 3.5% Al₂O₃ and 26.9% B₂O₃ which has previously been heated at different temperatures for various lengths of time. These curves represent the maximum strain in the unleached portion of the sample during leaching, plotted against the time or duration of heating. A positive strain denotes a swelling of the glass on leaching and a negative strain denotes a shrinkage. The point on the strain axis through which the curves pass when extended represents the result obtained for this glass with no heat treatment other than that acquired during fabrication.

With the exception of the curve for 600° it will be noted that, as the duration of heat treatment increases, the strain increases to a maximum, which is different for each temperature chosen and which, when attained, remains substantially constant. As the temperature of heat treatment is decreased the maximum strain attained becomes greater. However, the rate of change in the physical structure of the glass, that is, phase separation, becomes slower, as a result partly of the increased viscosity, and the time of heating required to attain maximum strain becomes greater as the temperature is decreased. Hence the highest compressions in the leached layer are obtained through the use of the lowest temperatures of heat treatment provided a sufficient length of time is employed. Temperatures lower than 500° C. require too long a time to be practical for the purpose of the present invention.

It will further be noted that as the temperature of heat treatment is increased the maximum strain attained becomes less and for temperatures in the neighborhood of 600° C. the strain decreases with time. On account of crazing, with this glass the points for the curve for 600 C. are approximations. Temperatures higher than 600 C. would cause deformation of hollow ware and articles such as dishes which cannot be supported, but for sheets and similar flat articles when supported temperatures as high as 650 C. may be employed. The shrinkage which would result on leaching articles of this particular glass heat treated at such high temperatures, would result in crazing but for other glasses may be prevented by suitable changes in the glass composition as will appear.

It will also be seen that the curves for temperatures lower than 600 C. cross the time axis representing zero strain at different points which indicates that heat treatment at those temperatures for those time would result in substantially no strain. However, the slope of the curve for 575° C. near the time axis is almost zero, that is, the amount of resultant strain has nearly attained constant value, while the slopes of the curves for lower temperatures on the time axis are relatively large or the rate of change of strain with time is large. Therefor a heat treatment for about 20 hours at 575° C. is the preferable heat treatment for this particular glass. In any event, it is desirable to employ a heat treatment of several hours duration.

The variations in amount of strain caused by variations in time and temperature of heat treatment, which are described above for a glass of specific composition, are substantially the same in type for all compositions on and in the immediate neighborhood of the lines N and K shown in Fig. 1 and for compositions in the above defined quaternary system. Times and temperatures of heat treatment which cause positive strain on leaching may be compensated and substantially zero strain may result, despite such conditions, by shifting the composition of the glass to the left or in the direction of increasing tension as indicated in Fig. 1. Conversely times and temperatures of heat treatment which cause negative strain on leaching may be compensated by shifting the compositions to the right. In other words, conditions of heat treatment which would cause swelling on leaching require an increase in the ratio $R_2O:B_2O_3$, or the ratio $R_2O+Al_2O_3:B_2O_3$, in order to prevent the development of strain on leaching, and conditions of heat treatment which would cause shrinking on leaching require a decrease in these ratios.

From the above it will now be apparent that in the case of unavoidable variations in composition of the above defined glasses whereby, with a given heat treatment, strain would be developed during leaching, such variations in composition may be compensated by suitable variation in time and/or temperature of heat treatment and thus leaching may be carried out without the development of substantial strain. Such control constitutes one of the chief advantages of the invention because, despite the most rigid control of batch composition, appreciable variations in glass composition occur from one melt to the next and in a continuous tank the composition of the glass may vary appreciably from day to day. By the construction of curves as shown in Fig. 2, appropriate changes may be made in the time/or temperature of heat treatment and the efficiency of production may thus be maintained at a high level.

Such curves may readily be constructed by heating small plates of the glass 1 mm. in thickness for various lengths of time at different temperatures, leaching the samples and measuring the strain developed therein during leaching.

Figure 3:
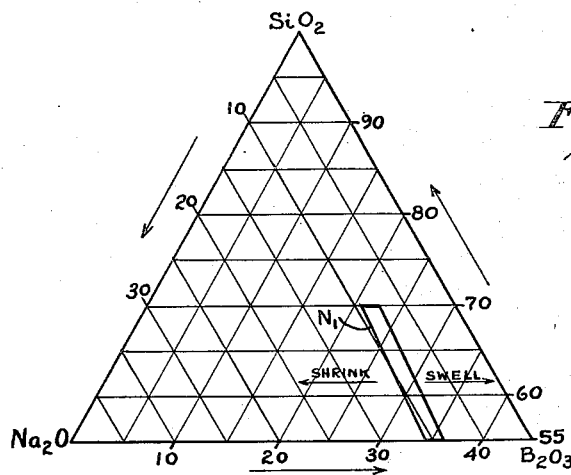
Fig. 3 is a graph on triangular coordinates representing a specific field of glass compositions in the ternary system $Na_2O$—$B_2O_3$—$SiO_2$.
Figure 4:
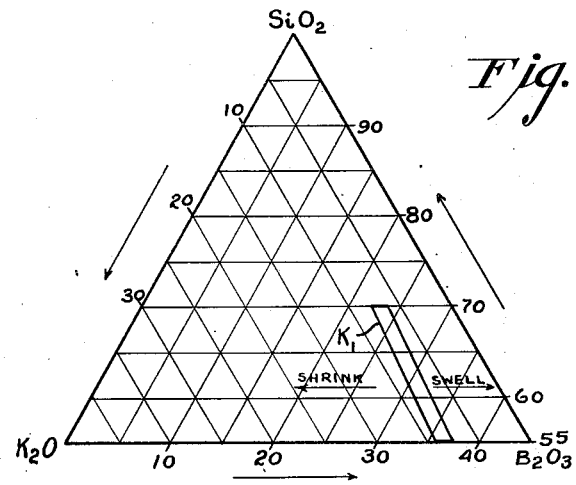
Fig. 4 is a graph on triangular coordinates representing a specific field of glass compositions in the ternary system $K_2O$—$B_2O_3$—$SiO_2$.

The extent to which variations in the compositions of the above defined glasses may be compensated by varying the conditions of heat treatment or, in other words, the extent of the fields of compositions which can be leached without the development of substantial strain by suitable variation and control of the conditions of heat treatment are illustrated for the ternary systems in Figs. 3 and 4 by the areas within the parallelograms designated $N_1$ and $K_1$ respectively.

In Fig. 3 it will be seen that compositions falling within the area $N_1$ contain from 55% to 70% $SiO_2$ and from $(10.5$ minus $.1X)\%$ to $(9$ minus $.1X)\%$ $Na_2O$ where X is the excess of silica over 55%, the balance being $B_2O_3$.

In Fig. 4 the compositions falling within the area $K_1$ contain from 55% to 70% $SiO_2$ and from $(9$ minus $.1X)\%$ to $(7.5$ minus $.1X)\%$ $K_2O$ where X is the excess of silica over 55%, the balance being $B_2O_3$.

Considering the two areas $N_1$ and $K_1$ it will be noted that in each the silica contents vary from 55% to 70%, but in area $N_1$ the alkali oxide varies from 7.5% to 10.5%, whereas in the area $K_1$ the alkali oxide varies from 6% to 9% the balance of the composition in each case being boric oxide. The compositions in these fields containing either or both of the alkalies may be expressed as comprising 55% to 70% $SiO_2$ and $(10.5$ minus $1.5Y$ minus $.1X)\%$ $R_2O$, where $R_2O$ is the total $Na_2O$ and $K_2O$; Y is the ratio $$\frac{K_2O}{R_2O}$$

and X is the excess $SiO_2$ over 55%, and containing boric oxide.

For the quaternary system $Na_2O$—$Al_2O_3$—$B_2O_3$—$SiO_2$, the extent of the field of compositions is expressed as $(55$ minus $1.25Z)\%$ to 70% $SiO_2$, 0 to 4% $Al_2O_3$, $(10.5$ minus $.1X$ minus $.17Z^2)\%$ to $(9$ minus $.1X$ minus $.17Z_2)\%$ $Na_2O$ and the remainder $B_2O_3$, where Z is the percentage of $Al_2O_3$ and X is the excess $SiO_2$ over 55%, X being negative when the $SiO_2$ is less than 55%. As an example, a composition in the field thus defined which we have found to be particularly suitable comprises

VI

| | Percent |
|---|---|
| $SiO_2$ | 61.8% |
| $Na_2O$ | 7.1 |
| $Al_2O_3$ | 3.6 |
| $B_2O_3$ | 27.5 |

The third variable factor in the control of swelling and shrinking, as hereinbefore pointed out, is the leaching condition or principally the temperature and concentration of the leaching acid. This factor, though of relatively minor importance, is nevertheless effective. A decrease in temperature of leaching will tend to increase the compressional stress in the leached layer if the glass swells on leaching and will tend to increase the tensional stress if the glass shrinks on leaching. The most desirable condition of leaching is the use of high temperature (up to the boiling point of the acid solution) and a low concentration (about 1 normal). Thick ware requires the most favorable condition of leaching, but as thickness is decreased the leaching condition may be altered and for ware of approximately 1 mm. in thickness the temperature may be as low as 60° C. and the concentration may be as high as 3 normal. The rate of leaching increases with temperature and concentration.

In practicing the invention a composition falling within one of the above defined fields is melted in the usual manner and fabricated into ware. The heat treatment conditions suitable for the glass selected are ascertained by determining the relation between the amount of strain developed on leaching and the time and temperature of heat treatment as described above. The articles are then heat treated under the conditions thus ascertained and are leached preferably under the condition of the highest temperature and concentration of the leaching bath that is compatible with the thickness of the article and are subsequently washed with water. The resulting glasses are porous in structure and may be vitrified by heating to a temperature in the neighborhood of 900° to 1100° C.

By means of the hereinbefore described process, we are able to produce articles of glass containing over 93% silica, from 0.05% to 0.25% alkali oxide and from 2% to 6% boric oxide. We have also succeeded in producing glasses consisting of over 94% $SiO_2$, 0.05% to 0.25% $Na_2O$, 0.5% to 2% $Al_2O_3$ and 3% to 6% $B_2O_3$. As an example of such a glass the following composition is given: 95.5% $SiO_2$, 0.05% $Na_2O$, 0.8% $Al_2O_3$ and 3.7% $B_2O_3$.

We claim:

1. A glass containing over 94% silica, 0.05% to 0.25% alkali oxide and 2% to 6% boric oxide.

2. A glass consisting of over 94% $SiO_2$, 0.05% to 0.25% $Na_2O$, 0.5% to 2% $Al_2O_3$ and 3% to 6% $B_2O_3$.

3. A glass consisting of about 95.5% $SiO_2$, 0.05% $Na_2O$, 0.8% $Al_2O_3$ and 3.7% $B_2O_3$.

4. A glass containing silica, boric oxide and alkali, the silica being over 94%, the boric oxide being under 6% and the alkali being under .25%.

HARRISON P. HOOD.
MARTIN E. NORDBERG.